(12) United States Patent
Tamura

(10) Patent No.: US 11,040,431 B2
(45) Date of Patent: Jun. 22, 2021

(54) WORKPIECE HOLDER

(71) Applicant: LINE WORKS CO., LTD., Chiba (JP)

(72) Inventor: Shuji Tamura, Chiba (JP)

(73) Assignee: LINE WORKS CO., LTD., Chiba (JP)

( * ) Notice: Subject to any disclaimer, the term of this patent is extended or adjusted under 35 U.S.C. 154(b) by 146 days.

(21) Appl. No.: 16/574,611

(22) Filed: Sep. 18, 2019

(65) Prior Publication Data
US 2020/0246941 A1 Aug. 6, 2020

(30) Foreign Application Priority Data

Feb. 5, 2019 (JP) .............................. JP2019-018706

(51) Int. Cl.
*B23Q 1/00* (2006.01)
*B25B 5/14* (2006.01)

(52) U.S. Cl.
CPC .................................. *B25B 5/147* (2013.01)

(58) Field of Classification Search
CPC ........... B25B 1/00; B25B 1/24; B25B 1/2484; B25B 5/06; B25B 11/00; B25B 11/02; B23Q 3/06; B23Q 3/063; B23Q 3/10
See application file for complete search history.

(56) References Cited

U.S. PATENT DOCUMENTS

| 3,981,605 | A | * | 9/1976 | Wirsing | .................. B23B 41/00 408/88 |
| 7,648,132 | B2 | * | 1/2010 | Hediger | ............. B23Q 11/0032 269/310 |
| 2012/0168999 | A1 | * | 7/2012 | Zheng | ...................... B23Q 5/40 269/60 |
| 2020/0246941 | A1 | * | 8/2020 | Tamura | .................. B25B 5/147 |

OTHER PUBLICATIONS

"Automatic Pallet Changer", Super Lock series, Dec. 5, 2018, http://lineworks.info/product/positionaers-peripheral/.

* cited by examiner

*Primary Examiner* — Lee D Wilson
(74) *Attorney, Agent, or Firm* — Oliff PLC

(57) ABSTRACT

A workpiece holder, which does not require actual parts matching as required in a related-art automatic pallet changer, and has higher maintainability than a related-art automatic pallet changer. The workpiece-side jig includes a workpiece-side fitting element provided on a surface opposed to the master-side jig. The master-side jig includes: a master-side fitting element to be fitted to the workpiece-side fitting element, which is provided on a surface opposed to the workpiece-side jig; a rotary pressing member to be brought into abutment against the workpiece-side fitting element fitted to the master-side fitting element to press the workpiece-side fitting element toward the master-side jig; and a rotational drive source configured to rotate the rotary pressing member. When the rotary pressing member is rotated by the rotational drive source, the rotary pressing member is brought into abutment against the workpiece-side fitting element to press the workpiece-side fitting element toward the master-side jig.

4 Claims, 6 Drawing Sheets

WORKPIECE HOLDER

BACKGROUND OF THE INVENTION

1. Field of the Invention

The present invention relates to a workpiece holder, which is to be used, in processing of a workpiece with use of various kinds of machines such as a welding machine, a machine tool, and an assembling machine (hereinafter collectively referred to as "processing machine"), for mounting and dismounting the workpiece being a target to be processed to and from the processing machine.

2. Description of the Related Art

When various kinds of processing (work) such as welding, hole formation, cutting, and assembly are performed for a workpiece, various kinds of processing machines are used. For example, in processing of a large-size workpiece, a positioner capable of holding the workpiece being a target to be processed and positioning the workpiece at a predetermined position is used. Hitherto, as a device (workpiece holder) to be used for mounting and dismounting a workpiece to and from a positioner, there exists an automatic pallet changer (website of Line Works Co., Ltd., "SUPER LOCK series", URL: http://lineworks.info/product/positionaers-peripheral/) developed by the applicant of the present application.

The automatic pallet changer described above includes a workpiece-side jig and a master-side jig. A workpiece being a target to be processed is fixed to the workpiece-side jig. The master-side jig is fixed to the positioner. Workpiece-side fitting elements, each including a fitting recessed portion and a locking flange, are provided on a surface of the workpiece-side jig, which is opposed to the master-side jig. Master-side fitting elements, a rotary member, and a rotational drive source are provided on a surface of the master-side jig, which is opposed to the workpiece-side jig. Each of the mater-side fitting elements includes a fitting protruding portion to be fitted into a corresponding one of the fitting recessed portions and a retainer ring with lever. The rotary member is engaged with the levers of the retainer rings with lever to rotate the retainer rings with lever. The rotational drive source is configured to rotate the rotary member.

The automatic pallet changer is configured in the following manner. The rotary member is rotated under a state in which the fitting recessed portions of the workpiece-side fitting elements and the fitting protruding portions of the master-side fitting elements are fitted together. As a result, the retainer rings with lever, which are engaged with the rotary member, are rotated. Through the rotation of the retainer rings with lever, the workpiece-side fitting elements are pressed downward to be fixed (locked) to the master-side jig.

The automatic pallet changer does not have any serious problems. However, the automatic pallet changer has room for improvement in the following two points.

The first point is the need for positioning work for the workpiece-side fitting elements. The related-art automatic pallet changer has such a structure that the workpiece-side jig and the master-side jig cannot be fitted together when a position of a protruding portion formed at an inner peripheral edge of each of the retainer rings with lever and a position of a cutout formed in a corresponding one of the workpiece-side fitting elements do not match each other. Thus, for example, in assembly of a product or in a case of additional order of the workpiece-side fitting element, a mounting position of each of the workpiece-side fitting elements is required to be adjusted through actual parts matching.

The second point is the need for effort and time for maintenance. In the related-art automatic pallet changer, for example, sputter generated during welding work or chip powder generated during cutting sometimes intrudes into a gap between the fitting protruding portion and the retainer ring with lever. When the sputter or the chip powder intruding into the gap adheres to or is accumulated on a peripheral wall of the gap or a floor surface, it becomes difficult to fit the workpiece-side fitting elements to the master-side fitting elements. As a result, the workpiece-side fitting elements and the master-side fitting elements cannot be fixed to each other in some cases. Thus, the gaps between the fitting protruding portions and the retainer rings with lever are required to be frequently cleaned.

SUMMARY OF THE INVENTION

The present invention has been made in view of the circumstances described above, and has an object to provide a workpiece holder, which does not require actual parts matching as required in a related-art automatic pallet changer, and has higher maintainability than the related-art automatic pallet changer.

According to one embodiment of the present invention, there is provided a workpiece holder, which is to be used for, in processing of a workpiece with use of a processing machine, mounting and dismounting the workpiece being a target to be processed to and from the processing machine, the workpiece holder including: a workpiece-side jig to which the workpiece being the target to be processed is to be fixed; and a master-side jig to be fixed to the processing machine. The workpiece-side jig includes a workpiece-side fitting element provided on a surface opposed to the master-side jig. The master-side jig includes: a master-side fitting element to be fitted to the workpiece-side fitting element, which is provided on a surface opposed to the workpiece-side jig; a rotary pressing member to be brought into abutment against the workpiece-side fitting element fitted to the master-side fitting element to press the workpiece-side fitting element toward the master-side jig; and a rotational drive source configured to rotate the rotary pressing member. When the rotary pressing member is rotated by the rotational drive source, the rotary pressing member is brought into abutment against the workpiece-side fitting element to press the workpiece-side fitting element toward the master-side jig.

The workpiece holder according to an embodiment of the present invention has the following effects in accordance with a configuration thereof.

(1) Instead of a structure of fitting a protruding portion of a retainer ring with lever to a cutout of a corresponding workpiece-side fitting element as in a related-art automatic pallet changer, the workpiece holder according to the embodiment of the present invention has such a structure that a rotary member is brought into abutment against the workpiece-side fitting elements to press the workpiece-side fitting elements toward the master-side jig. Thus, adjustment through actual parts matching is not required.

(2) A gap (gap between a master-side fitting protruding portion and the retainer ring with lever corresponding thereto), which may be formed in the related-art automatic pallet changer, is not formed. Thus, for example, sputter generated during welding work or chip powder generated during cutting does not intrude into the workpiece holder. Thus, maintenance of the workpiece holder is easy.

DESCRIPTION OF THE EMBODIMENTS (Embodiment)

An example of an embodiment of a workpiece holder according to the present invention is described with reference to the accompanying drawings. The workpiece holder according to the present invention is to be used for, in processing of a workpiece W with use of a processing machine, mounting and dismounting the workpiece W to and from the processing machine. In the following description, a case in which the processing machine is a positioner P is described as an example.

Figure 1:
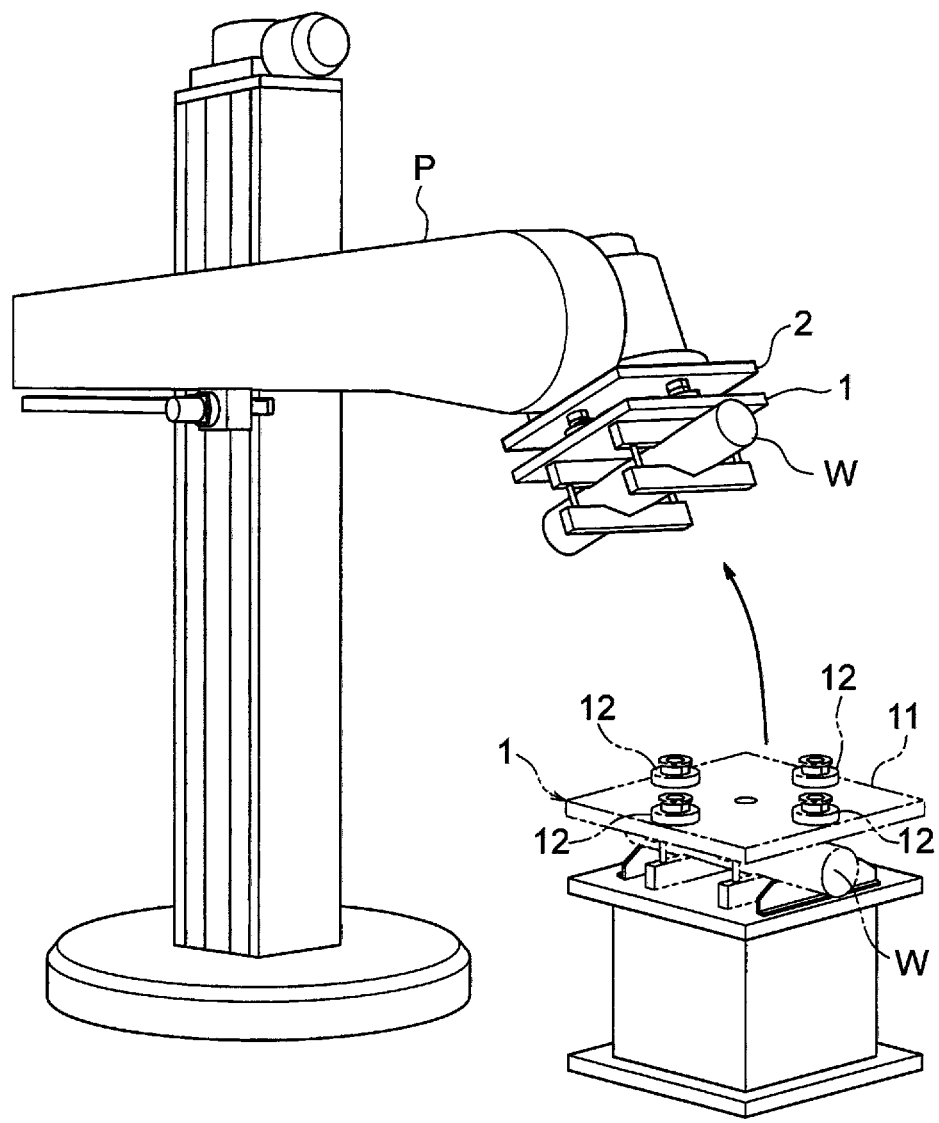
FIG. 1 is a perspective view for illustrating an example of use conditions of a workpiece holder according to the present invention.

As illustrated in FIG. 1, the workpiece holder of this embodiment includes a workpiece-side jig 1 and a master-side jig 2. The workpiece W being a target to be processed is fixed to the workpiece-side jig 1. The master-side jig 2 is fixed to the positioner P.

Figure 2:
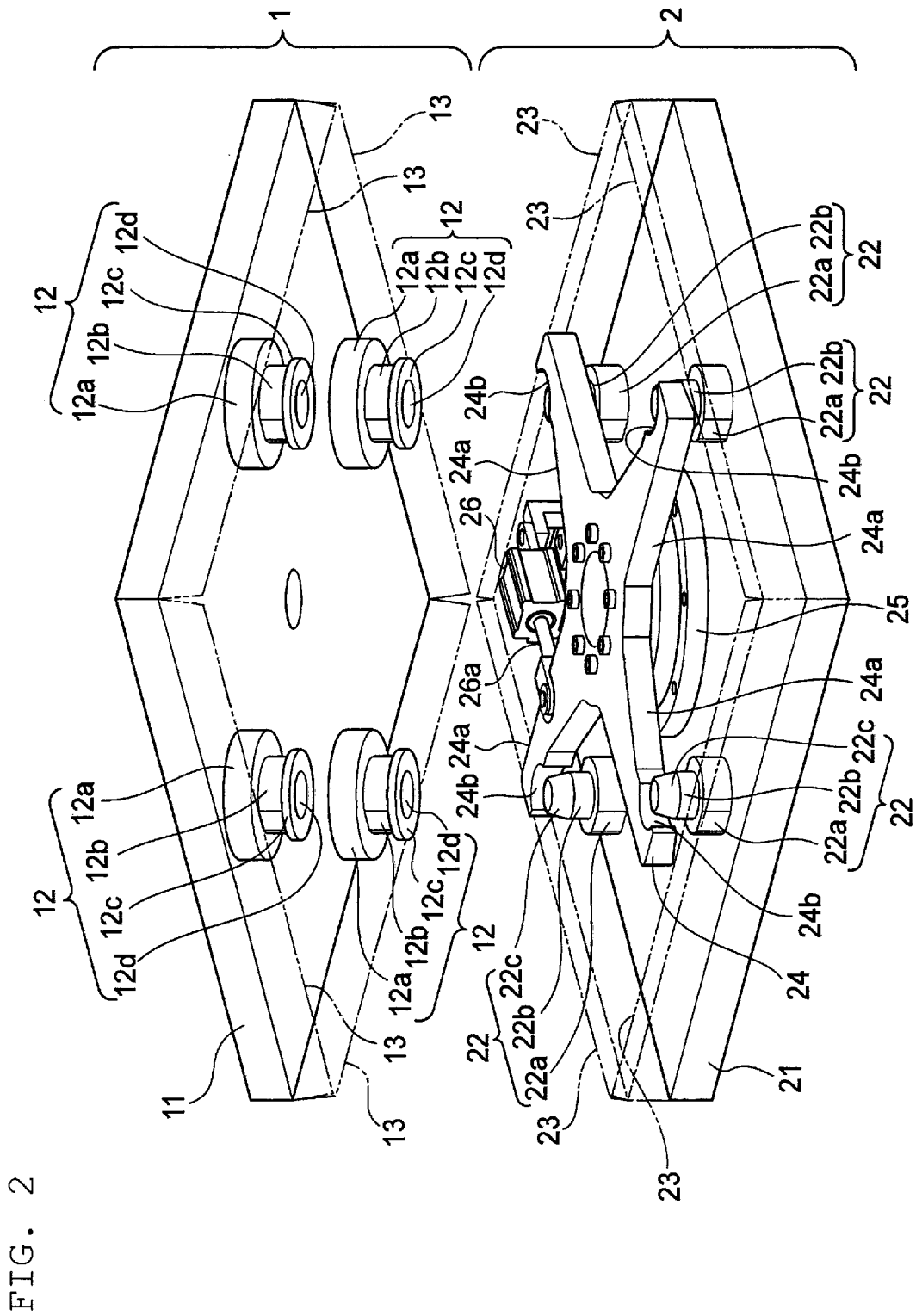
FIG. 2 is an explanatory view for illustrating an example of the workpiece holder according to the present invention.

The workpiece-side jig 1 includes, as illustrated in FIG. 2, a base body (hereinafter referred to as "workpiece-side base") 11 having a square shape and fitting elements (hereinafter referred to as "workpiece-side fitting elements") 12. The workpiece-side fitting elements 12 are provided on a surface (lower surface in FIG. 2) of the workpiece-side base 11, which is opposed to the master-side jig 2. Guide elements (hereinafter referred to as "workpiece-side guides") 13, each having a flat shape, are provided at four sides of the workpiece-side base 11 so as to project downward.

A back surface (surface on the side opposite to the surface on which the workpiece-side fitting elements 12 and the like are provided) of the workpiece-side base 11 corresponds to a workpiece mounting surface onto which the workpiece W of any of various types is to be mounted (see FIG. 1).

In this embodiment, four workpiece-side fitting elements 12 are provided. The four workpiece-side fitting elements 12 are provided at positions equidistant from a center of the workpiece-side base 11 (provided on the same circumference) so that each of the workpiece-fitting elements 12 is located in the vicinity of the center of a corresponding one of the sides. More specifically, in FIG. 3A and FIG. 3B, one of the workpiece-side fitting elements 12 is provided in the vicinity of the center of an upper side, another one is provided in the vicinity of the center of a lower side, another one is provided in the vicinity of the center of a left side, and the other one is provided in the vicinity of the center of a right side.

Figure 3A:
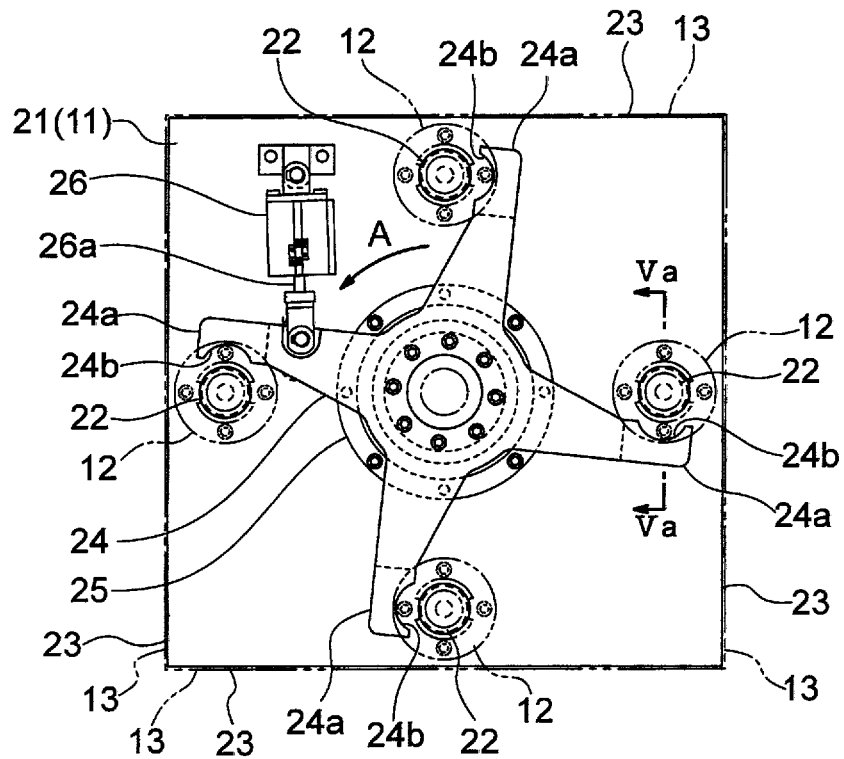
FIG. 3A is a plan view of the workpiece holder before a rotary pressing member is rotated.
Figure 3B:
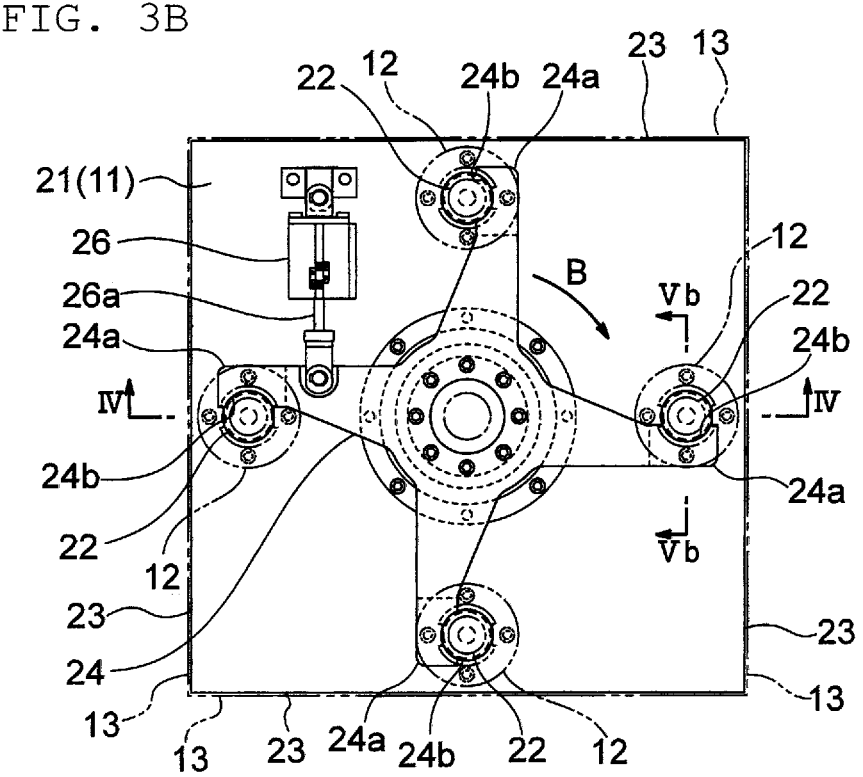
FIG. 3B is a plan view of the workpiece holder under a state in which the rotary pressing member is rotated counterclockwise.

In other words, an upper one and a lower one of the workpiece-side fitting elements 12 of FIG. 3A and FIG. 3B are provided at such positions that a straight line connecting a center of the upper one and a center of the lower one passes through both of a midpoint of the upper side and a midpoint of the lower side of the workpiece-side base 11, and a right one and a left one of the workpiece-side fitting elements 12 are provided at such positions that a straight line connecting a center of the right one and a center of the left one passes through both of a midpoint of the right side and a midpoint of the left side of the workpiece-side base 11. The workpiece-side fitting elements 12 may be provided at other positions as long as the workpiece-side fitting elements 12 are fitted over fitting elements 22 provided to the master-side jig 2 (hereinafter referred to as "master-side fitting elements 22"). The number of workpiece-side fitting elements 12 may be larger or smaller than four as long as the number of workpiece-side fitting elements 12 corresponds to the number of master-side fitting elements 22.

Each of the workpiece-side fitting elements 12 of this embodiment includes a workpiece-side seat portion 12a, a body portion 12b having a cylindrical shape, and a locking flange 12c. The workpiece-side fitting element 12a is threadably fixed onto the workpiece-side base 11. The body portion 12b is formed on the workpiece-side seat portion 12a so as to project downward. The locking flange 12c is formed on a lower end-side peripheral edge of the body portion 12b so as to project outward. The body portion 12b of this embodiment has a recessed portion 12d formed in the center, into which a corresponding one of the master-side fitting elements 22 is to be fitted. A rotary pressing member 24 described later is brought into abutment against the locking flange 12c. The locking flange 12c of this embodiment has a circular ring shape, and is formed on the entire periphery of a main body. The locking flange 12c may have a cutout formed in part thereof.

The master-side jig 2 includes a base body (hereinafter referred to as "master-side base") 21 having a square shape and the master-side fitting elements 22. The master-side fitting elements 22 are provided on a surface (upper surface in FIG. 2) of the master-side base 21, which is opposed to the workpiece-side jig 1. Guide elements (hereinafter referred to as "master-side guides") 23, each having a flat shape, are provided on four sides of the master-side base 21 so as to project upward.

An upper end of each of the master-side guides 23 of this embodiment is bent inward for ease of guiding of the workpiece-side guides 13. Instead of bending the upper end of each of the master-side guides 23 inward, a lower end of each of the workpiece-side guides 13 may be bent inward.

With the workpiece-side guides 13 provided to the workpiece-side jig 1 and the master-side guides 23 provided to the master-side jig 2 as in this embodiment, positioning between the workpiece-side jig 1 and the master-side jig 2 is facilitated. As a result, time required for positioning and fixing the workpiece W can be shortened.

In this embodiment, four master-side fitting elements 22 are provided. Each of the mater-side fitting elements 22 is provided at such a position (in the vicinity of the center of a corresponding one of the sides) as to be opposed to a corresponding one of the workpiece-side fitting elements 12. The master-side fitting elements 22 may be provided at positions other than those described above as long as the master-side fitting elements 22 are successfully fitted into the workpiece-side fitting elements 12. The number of master-side fitting elements 22 may be larger or smaller than four as long as the number of master-side fitting elements 22 corresponds to the number of workpiece-side fitting elements 12.

Each of the master-side fitting elements 22 of this embodiment includes a master-side seat portion 22a and a protruding portion 22b having a columnar shape. The master-side seat portion 22a is threadably fixed onto the master-side base 21. The protruding portion 22b is formed on the master-side base portion 22a so as to project upward. The protruding portion 22b of this embodiment has a tapered guide surface 22c that is tapered toward an upper side. With the formation of the tapered guide surface 22c on the protruding portion 22b, even when a slight shift (horizontal shift) occurs between the workpiece-side fitting elements 12 and the master-side fitting elements 22, the protruding portions 22b can be reliably fitted into the recessed portions 12d of the workpiece-side fitting elements 12, respectively.

In the center of the master-side base 21 (on the inner side of the four master-side fitting elements 22), a rotary pressing member 24 is provided. The rotary pressing member 24 is brought into abutment against the workpiece-side fitting elements 12 fitted over the master-side fitting elements 22 to press the workpiece-side fitting elements 12 toward the master-side jig 2.

Figure 4:
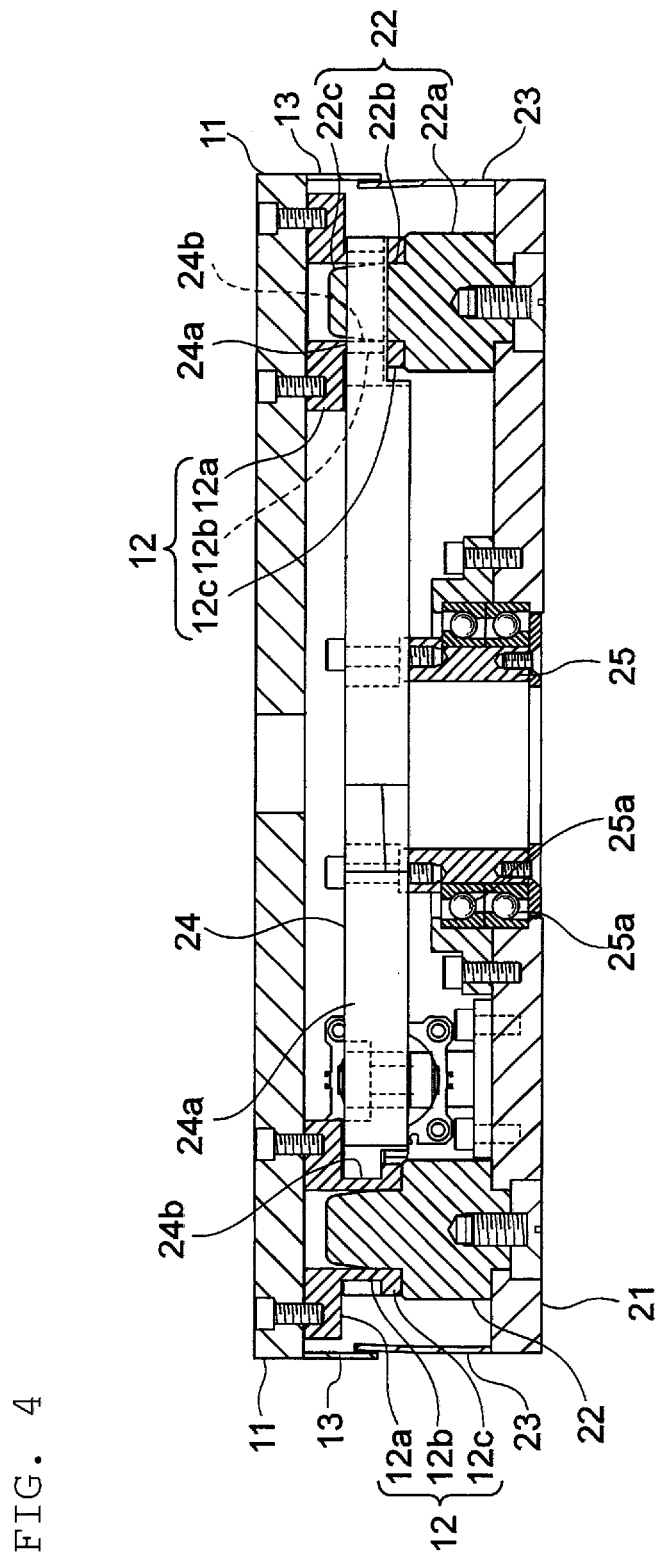
FIG. 4 is a sectional view of FIG. 3B taken along the line IV-IV.

The rotary pressing member 24 of this embodiment includes four arms 24a, and has a cross-like shape in plan view. The rotary pressing member 24 is rotatably supported on the master-side base 21 through intermediation of a rotary mechanism 25 including, for example, bearings 25a (see FIG. 4). For the rotary mechanism 25, for example, a metal touch structure may be used in place of the bearings 25a. An abutment portion 24b, which is formed by cutting out to have a semi-circular shape, is formed on a surface of each of the arms 24a, which is on a forward side in a rotating direction (counterclockwise direction in FIG. 3A) of each of the arms 24a. The abutment portion 24b is a portion to be brought into abutment against a corresponding one of the workpiece-side fitting elements 12 fitted over the master-side fitting elements 22.

A bottom surface 24c of each of the abutment portions 24b of this embodiment is formed as a tapered surface inclined downward from the forward side toward a rearward side in the rotating direction of the rotary pressing member 24. With the formation of the bottom surface 24c of each of the abutment portions 24b as the tapered surface described above, the effect of reliably pressing the workpiece-side fitting elements 12 toward the master-side fitting elements 22 is attained.

A rotational drive source 26 configured to rotate the rotary pressing member 24 is provided to the master-side base 21. In this embodiment, an air cylinder is used as the rotational drive source 26. A distal end of a rod 26a is connected to the rotary pressing member 24. When the air cylinder is operated to move the rod 26a forward, the rotary pressing member 24 is rotated counterclockwise (in a direction indicated by the arrow A in FIG. 3A; the same definition is used in the following description). When the rod 26a is retreated, the rotary pressing member 24 is rotated clockwise (in a direction indicated by the arrow B in FIG. 3B; the same definition is used in the following description).

In this embodiment, one rotational drive source 26 is provided as an example. However, two or more rotational drive sources 26 maybe provided. In this case, the two or more rotational drive sources 26 are controlled so as to be operated in synchronization with each other. When two or more rotational drive sources 26 are provided, it is preferred that the rods 26a of the rotational drive sources 26 be separately connected to different ones of the arms 24a.

(Other Embodiments)

In the embodiment described above, the rotary pressing member 24 is rotated counterclockwise to press the workpiece-side jig 1 toward the master-side jig 2 as an example. However, the rotary pressing member 24 may be rotated clockwise to press the workpiece-side jig 1 toward the master-side jig 2.

In the embodiment described above, the air cylinder is used as the rotational drive source 26 as an example. However, a rotational drive source other than the air cylinder, for example, a hydraulic cylinder, may be used as the rotational drive source 26.

In the embodiment described above, the number of arms 24a of the rotary pressing member 24 is four as an example. However, the number of arms 24a of the rotary pressing member 24 may be larger or smaller than four.

In the embodiment described above, the guide elements 13 and 23 are provided to both of the workpiece-side jig 1 and the master-side jig 2. However, the guide elements may be provided to only any one of the workpiece-side jig 1 and the master-side jig 2. The guide elements 13 and 23 may be omitted in some cases.

The embodiment described above is merely an example, and the configuration of the workpiece holder of the present invention is not limited to the configuration of the embodiment described above. The configuration of the workpiece holder of the present invention may be suitably changed as long as the intended object of the present invention is achieved.

In the embodiment described above, the positioner is described as an example of the processing machine. However, the processing machine may be, for example, a welding machine, a machine tool, or an assembling machine.

(Action)

Figure 5A:
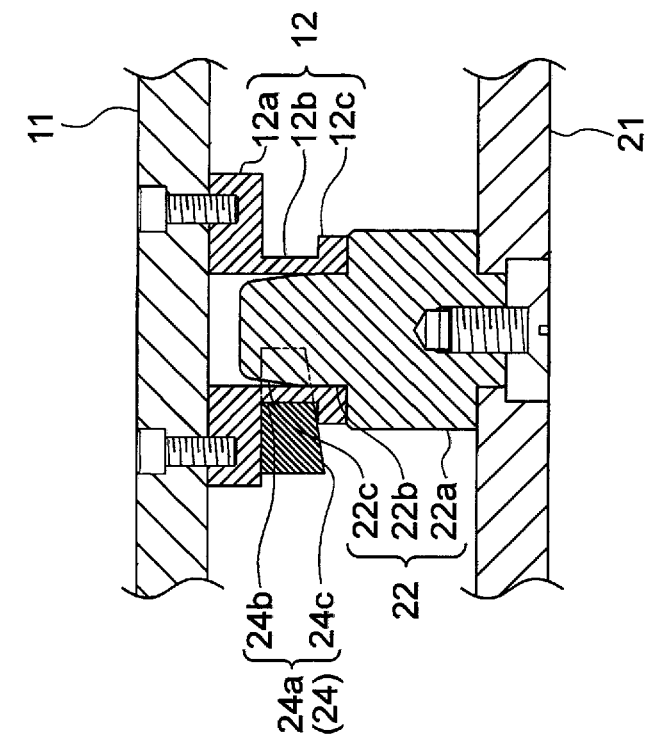
FIG. 5A is a sectional view of FIG. 3A taken along the line Va-Va.
Figure 5B:
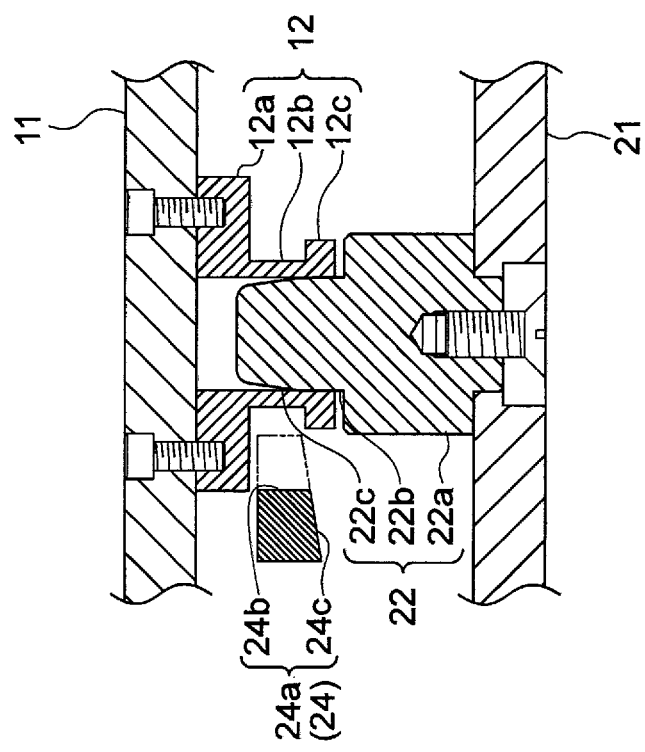
FIG. 5B is a sectional view of FIG. 3B taken along the line Vb-Vb.
Figure 6A:
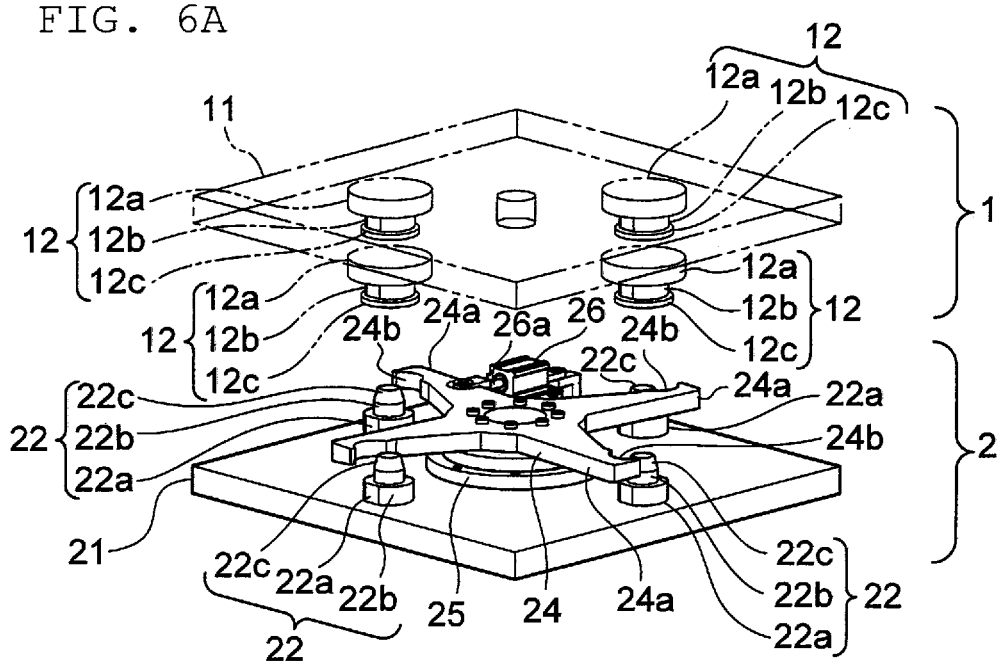
FIG. 6A is a perspective view for illustrating a state in which a workpiece-side jig and a master-side jig are separated from each other.
Figure 6B:
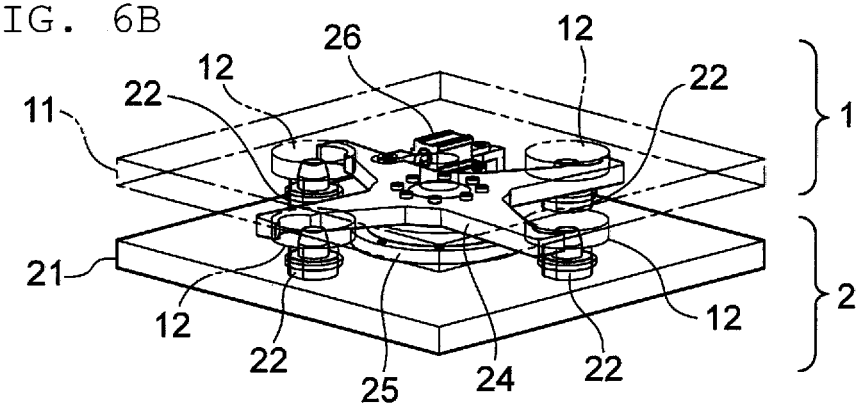
FIG. 6B is a perspective view for illustrating a state in which workpiece-side fitting elements and master-side fitting elements are fitted together.
Figure 6C:
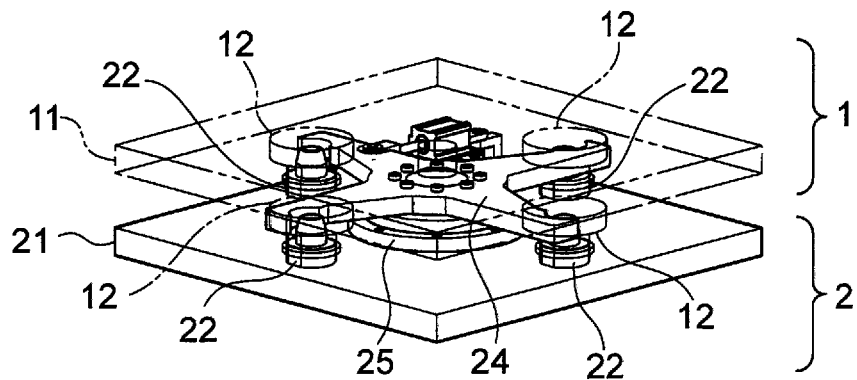
FIG. 6C is a perspective view for illustrating a state in which the workpiece-side fitting elements fitted to the master-side fitting elements are pressed with the rotary pressing member.

In the workpiece holder of the present invention, the workpiece-side jig 1 and the master-side jig 2, which are opposed to each other as illustrated in FIG. 6A, are brought closer to each other so that the workpiece-side fitting elements 12 provided on the workpiece-side jig 1 are fitted into the master-side fitting elements 22 provided on the master-side jig 2 (FIG. 5A and FIG. 6B). When the rotary pressing member 24 is rotated counterclockwise under a state in which the workpiece-side fitting elements 12 and the master-side fitting elements 22 are fitted together, the abutment portions 24b and the bottom surfaces 24c of the arms 24a of the rotary pressing member 24 are brought into abutment against the body portions 12b and the locking flanges 12c of the workpiece-side fitting elements 12 to press the workpiece-side jig 1 toward the master-side jig 2 (FIG. 5B and FIG. 6C).

On the other hand, when the rotary pressing member 24 is rotated clockwise under a state in which the workpiece-side jig 1 are pressed toward the master-side jig 2 after the abutment portions 24b and the bottom surfaces 24c of the arms 24a of the rotary pressing member 24 are brought into abutment against the body portions 12b and the locking flanges 12c of the workpiece-side fitting elements 12, the abutment portions 24b and the bottom surfaces 24c of the arms 24a of the rotary pressing member 24 are separated from the body portions 12b and the locking flanges 12c of the workpiece-side fitting elements 12 to release the pressing of the workpiece-side jig 1 toward the master-side jig 2.

(Example of Use)

An example of use of the workpiece holder of the present invention is now described. A case in which a second workpiece W is processed after termination of processing of a first workpiece W is described as an example.

(1) The first workpiece W is mounted to the workpiece mounting surface of the workpiece-side jig 1.

(2) The workpiece-side jig 1 on which the first workpiece W is mounted is fixed to the master-side jig 2. More specifically, after the workpiece-side fitting elements 12 and the master-side fitting elements 22 are fitted together, the workpiece-side fitting elements 12 are pressed with the rotary pressing member 24 to be connected to the master-side jig 2.

(3) Under the state in the step (2) described above, the first workpiece W mounted on the workpiece mounting surface is processed.

(4) After termination of the processing of the first workpiece W, the workpiece-side jig 1 and the master-side jig 2 are separated from each other. More specifically, the pressing of the workpiece-side fitting elements 12 with the rotary pressing member 24 is cancelled to disconnect the workpiece-side jig 1 and the master-side jig 2 from each other.

(5) The second workpiece W is mounted onto the workpiece mounting surface of the workpiece-side jig 1, which is different from the workpiece-side jig 1 onto which the first workpiece W is mounted. The second workpiece W is mounted in a separate step during the processing of the first workpiece W.

(6) The workpiece-side jig 1 onto which the second workpiece W is mounted is fixed to the master-side jig 2 in the same procedure as that in the step (2).

(7) Under a state in the step (6), the second workpiece W mounted on the workpiece mounting surface is processed.

(8) After termination of the processing of the second workpiece W, the workpiece-side jig 1 and the master-side jig 2 are separated from each other in the same procedure as that in the step (4).

(9) Subsequently, the steps (5) to (8) are repeated for a necessary number of times. As a result, the workpieces W can be efficiently processed in a continuous manner.

INDUSTRIAL APPLICABILITY

The workpiece holder of the present invention can be particularly suitably used as a holder for various kinds of workpieces W, especially, a large-size workpiece, which is difficult to, for example, manually position or replace.

REFERENCE SIGNS LIST 1 workpiece-side jig
2 master-side jig
11 base body (workpiece-side base)
12 fitting element (workpiece-side fitting element)
12a workpiece-side seat portion
12b body portion
12c locking flange
12d recessed portion
13 guide element (workpiece-side guide)
21 master-side base
22 fitting element (master-side fitting element)
22a master-side seat portion
22b protruding portion
22c tapered guide surface
23 guide element(master-side guide)
24 rotary pressing member
24a arm
24b abutment portion
24c bottom surface (of abutment portion)
25 rotary mechanism
25a bearing
26 rotational drive source
26a rod
P positioner
W workpiece

What is claimed is:

1. A workpiece holder, which is to be used for, in processing of a workpiece with use of a processing machine, mounting and dismounting the workpiece being a target to be processed to and from the processing machine, the workpiece holder comprising:

a workpiece-side jig to which the workpiece being the target to be processed is to be fixed; and a master-side jig to be fixed to the processing machine, wherein the workpiece-side jig includes a workpiece-side fitting element provided on a surface opposed to the master-side jig, wherein the master-side jig includes:

a master-side fitting element to be fitted to the workpiece-side fitting element, which is provided on a surface opposed to the workpiece-side jig;

a rotary pressing member to be brought into abutment against the workpiece-side fitting element fitted to the master-side fitting element to press the workpiece-side fitting element toward the master-side jig; and a rotational drive source configured to rotate the rotary pressing member, and wherein, when the rotary pressing member is rotated by the rotational drive source, the rotary pressing member is brought into abutment against the workpiece-side fitting element to press the workpiece-side fitting element toward the master-side jig.

2. The workpiece holder according to claim 1, wherein the workpiece-side fitting element comprises a plurality of the workpiece-side fitting elements, and the master-side fitting element comprises a plurality of the master-side fitting elements, and wherein, when the rotary pressing member is rotated by the rotational drive source, the rotary pressing member is brought into abutment against the plurality of workpiece-side fitting elements to press the plurality of workpiece-side fitting elements toward the master-side jig.

3. The workpiece holder according to claim 1, wherein an abutment portion of the rotary pressing member to be brought into abutment against the workpiece-side fitting element, is formed to have a tapered surface inclined downward from a forward side toward a rearward side in a rotating direction of the rotary pressing member.

4. The workpiece holder according to claim 1, wherein at least one of the workpiece-side jig and the master-side jig has a guide configured to guide the workpiece-side jig and the mater-side jig so as to achieve fitting between the workpiece-side fitting element and the master-side fitting element.

* * * * *